United States Patent
Stellmach

(10) Patent No.: US 10,852,816 B2
(45) Date of Patent: Dec. 1, 2020

(54) GAZE-INFORMED ZOOM AND PAN WITH MANUAL SPEED CONTROL

(71) Applicant: Microsoft Technology Licensing, LLC, Redmond, WA (US)

(72) Inventor: Sophie Stellmach, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/958,708

(22) Filed: Apr. 20, 2018

(65) Prior Publication Data

US 2019/0324530 A1    Oct. 24, 2019

(51) Int. Cl.
| | | |
|---|---|---|
| *G06F 3/01* | (2006.01) | |
| *G02B 27/01* | (2006.01) | |
| *G02B 27/00* | (2006.01) | |
| *G06F 3/0485* | (2013.01) | |

(52) U.S. Cl.
CPC .......... *G06F 3/013* (2013.01); *G02B 27/0093* (2013.01); *G02B 27/0172* (2013.01); *G06F 3/017* (2013.01); *G06F 3/0485* (2013.01); *G06F 2203/04806* (2013.01)

(58) Field of Classification Search
USPC ........................................................ 345/156
See application file for complete search history.

(56) References Cited

U.S. PATENT DOCUMENTS

| | | | | |
|---|---|---|---|---|
| 4,734,690 A | * | 3/1988 | Waller | G06T 15/20 345/427 |
| 6,351,273 B1 | | 2/2002 | Lemelson et al. | |
| 9,035,874 B1 | * | 5/2015 | Fowers | G06F 3/0482 345/156 |
| 2010/0223577 A1 | * | 9/2010 | Bennett | G06F 3/0481 715/800 |
| 2011/0289456 A1 | * | 11/2011 | Reville | G06F 3/017 715/830 |
| 2012/0235887 A1 | * | 9/2012 | Border | G06F 1/163 345/8 |
| 2012/0249741 A1 | * | 10/2012 | Maciocci | G06T 15/503 348/46 |
| 2013/0342564 A1 | * | 12/2013 | Kinnebrew | G02B 27/017 345/619 |
| 2014/0111427 A1 | * | 4/2014 | Lindley | G02B 27/017 345/156 |
| 2014/0152558 A1 | * | 6/2014 | Salter | G09G 5/377 345/157 |

(Continued)

OTHER PUBLICATIONS

Mollenbach, et al., "All Eyes on the Monitor", In Proceedings of the 13th International Conference on Intelligent User Interfaces, IUI'08, Jan. 13, 2008, 4 Pages.

(Continued)

*Primary Examiner* — Chineyere D Wills-Burns
(74) *Attorney, Agent, or Firm* — Ray Quinney & Nebeker P.C.; John O. Carpenter

(57) ABSTRACT

A method for improving user interaction with a virtual environment includes presenting a virtual environment to a user, measuring a first position of a user's gaze relative to a virtual environment, receiving a magnification input, and changing a magnification of the virtual environment centered on the first position and based on the magnification input.

20 Claims, 6 Drawing Sheets

(56) References Cited

U.S. PATENT DOCUMENTS

| | | | |
|---|---|---|---|
| 2014/0232639 A1* | 8/2014 | Hayashi | G06F 3/048 345/156 |
| 2014/0282275 A1* | 9/2014 | Everitt | G06F 3/017 715/863 |
| 2014/0344766 A1* | 11/2014 | Cao | G06F 3/017 715/863 |
| 2015/0077326 A1* | 3/2015 | Kramer | G06F 3/0325 345/156 |
| 2015/0130740 A1* | 5/2015 | Cederlund | G06F 3/014 345/173 |
| 2015/0355717 A1* | 12/2015 | Bastien | G06K 9/00355 345/156 |
| 2017/0083088 A1* | 3/2017 | Lannsjo | G06F 3/04842 |
| 2017/0235360 A1 | 8/2017 | George-svahn | |
| 2017/0336941 A1* | 11/2017 | Gribetz | G06T 19/006 |
| 2018/0364810 A1* | 12/2018 | Parshionikar | G06F 3/012 |

OTHER PUBLICATIONS

"International Search Report and Written Opinion Issued in PCT Application No. PCTUS19027412", dated Jul. 8, 2019, 12 Pages.

* cited by examiner

GAZE-INFORMED ZOOM AND PAN WITH MANUAL SPEED CONTROL

BACKGROUND

Background and Relevant Art

With emerging ubiquitous user interfaces (UI), such as smart devices and innovative head-mounted display technology, usage of such UIs becomes more common among non-specialists. Interaction with the UIs may be improved by making the interaction more intuitive and subtle. A well-established input paradigm is point-and-click or in more general terms: point-and-command. In emerging natural UIs, a command could for instance be triggered by different voice commands, hand gestures, or touch input.

An effortless and subtle way to indicate a user's context is to take advantage of gaze tracking data to infer a user's current reference frame. Several problems arise with this approach though, as eye tracking and additional commands are asynchronous (i.e., the eye gaze is usually preceding manual inputs and may have moved on to new targets upon finishing recognition of the manual input). In addition, due to technological constraints of the tracking system as well as physiological constraints of the human visual system, the computed gaze signal may be jittery and show offsets compared to the actual eye gaze. This increases the problem of reliably referring to small and closely positioned targets. Thus, an overall problem arises about how such multimodal inputs can be appropriately combined.

BRIEF SUMMARY

In some embodiments, a method for improving user interaction with a virtual environment includes presenting a virtual environment to a user, measuring a first position of a user's gaze relative to a virtual environment, receiving a magnification input, and changing a magnification of the virtual environment centered on the first position and based on the magnification input.

In other embodiments, a method for improving user interaction with a virtual environment includes presenting a virtual environment to a user, measuring a first position of a user's gaze relative to a virtual environment, receiving a magnification input, changing a magnification of the virtual environment centered on the first position and based on the magnification input, measuring a second position of the user's gaze relative to at least one element of the virtual environment, and panning the virtual environment relative to a user position based on the second position.

In yet other embodiments, a system for presenting visual information to a user includes a head-mounted display. The head-mounted display includes a near-eye display, a gaze-tracking device, a processor in communication with the near-eye display and the gaze-tracking device, and a hardware storage medium in communication with the processor. The hardware storage medium having instructions stored thereon that, when executed by the processor, cause the processor to measure a first position of a user's gaze relative to a virtual environment presented on the near-eye display, receive a magnification input, and change a magnification of the virtual environment centered on the first position and based on the magnification input.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
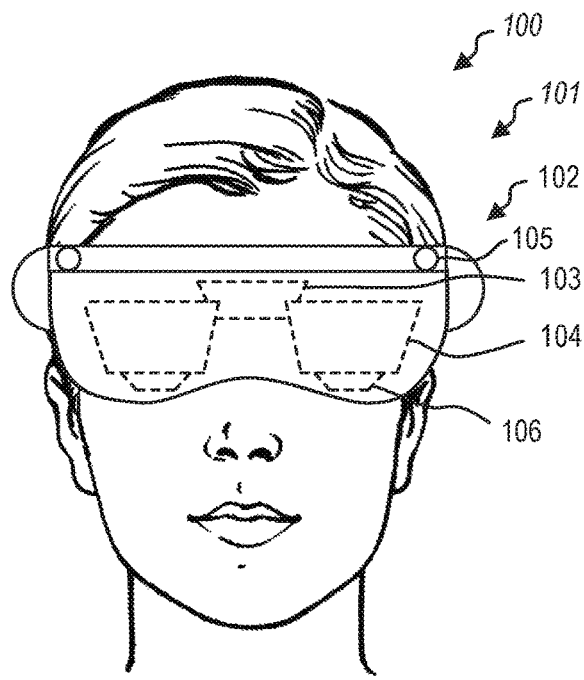
FIG. 1 is a perspective view of a head-mounted display (HMD) including a waveguide, according to at least one embodiment of the present disclosure.

This disclosure generally relates to devices, systems, and methods for visual user interaction with virtual environments. More specifically, the present disclosure relates to improving interaction with virtual elements using gaze-informed zoom and panning. In some embodiments, visual information may be provided to a user by a near-eye display. A near-eye display may be any display that is positioned near a user's eye, either to supplement a user's view of their surroundings, such as augmented or mixed reality devices, or to replace the user's view of their surroundings, such as virtual reality devices. In some embodiments, an augmented reality or mixed reality device may be a head-mounted display (HMD) that presents visual information to a user overlaid on the user's view of their surroundings. For example, the visual information from the HMD may be combined with ambient or environment light to overlay visual information, such as text or images, on a user's surroundings.

In some embodiments, the user's field of view may be at least partially encompassed by a waveguide through which the user views their surroundings. The waveguide may direct display light from a display device to the user's field of view. The waveguide may guide the display light before out-coupling the light. Upon out-coupling the light, the waveguide may combine the visual information of the display light with ambient light from the user's surroundings to deliver the visual information to the user.

Visual information including virtual environments may be positioned in the user's field of view on the waveguide or other near-eye display. A gaze-tracking device of the HMD may image at least a portion of the user's eye (such as the pupil, the iris, or the sclera) and identify a direction or location of the user's gaze. The direction or location of the user's gaze may then be extrapolated to a position on the near-eye display and/or in the virtual environment. A cursor may be associated with the gaze location to allow the user to highlight or select a position in the virtual environment by looking at that position. In other embodiments, a gaze-tracking device may include a gyroscope, an accelerometer, a plurality of sensors to triangulate position, or other devices that allow for the measurement of the orientation and/or position of the HMD relative to the virtual environment. For example, the user's "gaze" may be a ray cast forward from the HMD to approximate the user's gaze by approximating the user's head position and orientation as their gaze direction. In some examples, such a head-tracking "gaze" may be simpler than an eye-tracking gaze, as the user remains free to glance around in their field of view without inadvertently moving a gaze position cursor. In other examples, an eye-tracking gaze may be more intuitive as a user will naturally look at whatever object is of interest to the user during interactions with the virtual environment.

In some embodiments, gaze-informed zoom and panning, either by eye-tracking gaze or by head-tracking gaze, may allow for rapid manipulation of a user's perspective in a virtual environment. In other embodiments, gaze-informed zoom and panning may be employed in combination with manual, voice, peripheral, or other inputs to provide different scales of movement and manipulation for both speed and precision.

FIG. 1 is a perspective view of a user 100 wearing a HMD 101. In some embodiments, the HMD 101 may have a housing 102 that contains one or more processors, storage devices, power supplies, audio devices, display devices, cameras, communication devices, or combinations thereof, that receive, collect, store, process, or calculate information that is provided to the user. For example, a display device 103 may be positioned optically adjacent a waveguide(s) or other near eye display 104 to provide visual information to the near eye display 104, which may, in turn, be presented in the user's field of view by the near eye display 104.

In some embodiments, the HMD 101 may have a near eye display 104 positioned near the user 100 to direct visual information to the user 100. The HMD 101 may include a single near eye display 104, a separate near eye display 104 for each of the user's eyes (i.e., two near eye displays 104), or more than two near eye displays 104 to provide visual information over a larger field of view.

In some embodiments, the HMD 101 may include one or more cameras 105 that may image the user's physical environment. For example, the camera(s) 105 may be a visible light camera(s) 105 that may image the surrounding environment. A processor may perform image recognition routines on the visible light image to detect and recognize elements in the surrounding environment, such as physical objects or people. In other examples, the camera(s) 105 may be depth sensing camera(s) that may create a depth image of the surrounding environment. For example, the camera 105 may be a time-of-flight camera, a structured light camera, stereo cameras, or other cameras that may use visible, infrared, ultraviolet, or other wavelengths of light to collect three-dimensional information about the surrounding environment. In at least one example, the camera(s) 105 may be gesture recognition cameras that allow the HMD 101 to recognize and interpret hand gestures performed by the user 100 in front of the HMD 101.

In some embodiments, the HMD 101 may further include a gaze-tracking device 106 positioned in the HMD 101 to track a direction of the user's gaze. The gaze-tracking device 106 may include a camera or a plurality of cameras to image the user's eyes. In other words, the gaze-tracking device 106 may image the user's pupil, iris, sclera, other portions of the user's eye, or combinations thereof to calculate the direction the user is looking. In some embodiments, the gaze-tracking device 106 may measure and/or calculate the x- and y-components of the user's gaze. In other embodiments, the gaze-tracking device 106 may include a gyroscope, an accelerometer, a plurality of sensors to triangulate position, or other devices that allow for the measurement of the orientation and/or position of the HMD relative to the virtual environment. For example, the user's "gaze" may be a ray cast forward from the HMD to approximate the user's gaze by approximating the user's head position and orientation as their gaze direction.

Figure 2:
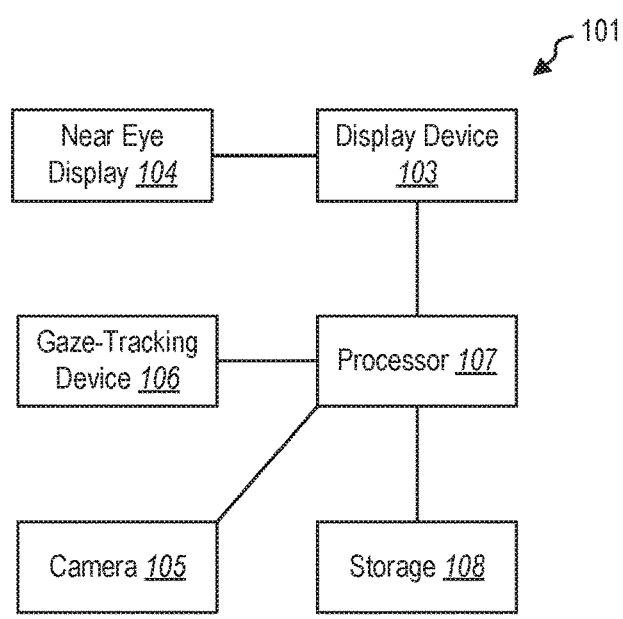
FIG. 2 is a schematic representation of the HMD of FIG. 1, according to at least one embodiment of the present disclosure.

FIG. 2 is a schematic representation of the HMD 101. The display device 103 in communication with the near eye display 104 may be in data communication with a processor 107. Similarly, the camera 105 and gaze-tracking device 106 may be in data communication with the processor 107. The processor 107 may further be in data communication with a storage device 108. The storage device 108 may be a hardware storage device, such as a platen-based storage device, a solid-state storage device, or other non-transitory or long-term storage device. The storage device 108 may have instructions stored thereon to perform one or more methods or portions of a method described herein.

Figure 3:
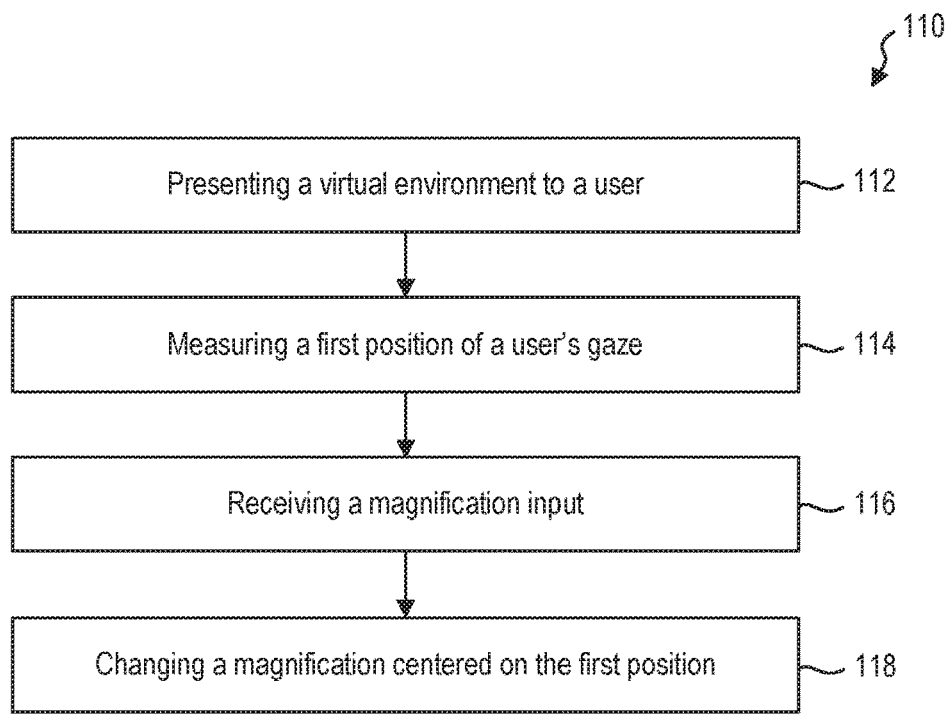
FIG. 3 is a flowchart illustrating a method of gaze-informed zoom within a virtual environment, according to at least one embodiment of the present disclosure.

FIG. 3 is a flowchart illustrating a method 110 of changing a user's perspective on a virtual environment. The method 110 may include presenting a virtual environment to a user at 112. In some embodiments, the virtual environment may be a three-dimensional space generated by the HMD or other computing device in communication with the HMD. In other embodiments, the virtual environment may be part of a shared environment. For example, a mixed reality HMD may present a virtual environment in combination with a surrounding physical environment of the user. In such embodiments, the HMD may measure the surrounding physical environment of the user using, for example, the cameras on the HMD or other sensors to impart information of the surrounding physical environment into a virtual environment to create a shared environment. The HMD may then use the shared environment to position a virtual element in a virtual environment relative to a physical element of the surrounding physical environment.

While the present disclosure described interaction with the virtual environment through a HMD, it should be understood that in other embodiments, the virtual environment may be presented on another display, such as a laptop, tablet, desktop, large format, or other display in communication with a processor and/or a gaze-tracking device. For example, the methods and systems described herein may be equally applicable to a user interacting with a large format display on a wall of a conference room. The user may zoom or pan within a virtual environment using a gaze-tracking device and other input devices in communication with the large format display. In other examples, a laptop may have a front facing camera that may function as a gaze-tracking device to allow gaze-based movement and/or manipulation of virtual elements by a user interacting with the laptop.

The method may include measuring a first position of a user's gaze location at 114. The first position may be measured by using a gaze-tracking device described herein to measure the position of either the user's gaze based on eye-tracking or the user's gaze based on heading tracking.

The method 110 may further include receiving a magnification input from an input device at 116. The magnification input may then cause the HMD to change a magnification of the virtual environment relative to the user at 118. In some embodiments, the input device may be a gesture recognition device, such as the camera(s), in data communication with the processor of the HMD. In other embodiments, the input device may be a voice recognition device, such as a microphone, in data communication with the processor of the HMD. In yet other embodiments, the input device may be a peripheral controller, such as a six degree-of-freedom (6DOF) controller or other motion-sensing controller, in data communication with the processor of the HMD. In yet other embodiments, the input device may be an input of a touch-sensing device, trackpad, mouse, keyboard or other conventional human interface device (HID) of a computer.

In some embodiments, the magnification input may be a one-handed gesture. For example, the magnification input may be continuous input in which a user performs an initialization input and the magnification input is continuously or substantially continuously recognized by a gesture recognition device. In at least one example, the initialization input may be a downward tap of a user's finger (as though to depress a button). In at least another example, the initialization input may be a pinching motion of a user's finger and thumb together (as though to grab the virtual environment in the first position). The initialization input may be recognized by a gesture recognition device and may set a null point or origin for the magnification input. The magnification input may be a movement of the user's hand relative to the null point.

For example, a user may move their hand forward (e.g., away from the user and/or toward the display) to "push" the virtual environment away from the user and zoom out. In other examples, a user may move their hand backward (e.g., toward the user and/or away from the display) to "pull" the virtual environment toward the user and zoom in. For some users, the opposite input may be more intuitive. For example, a user may move their hand forward (e.g., away from the user and/or toward the display) to "dive into" the virtual environment (or to indicate movement of the user's perspective toward the virtual environment) and zoom in. In other examples, a user may move their hand backward (e.g., toward the user and/or away from the display) to "back away from" the virtual environment and zoom out. The user may then cease the initialization input to terminate the continuous measurement of the magnification input and stop zooming. For example, the user may lift their finger (as though releasing the button) or relax their finger and thumb (as though releasing a grasp on the virtual environment).

In some embodiments, the magnification input may be a two-handed gesture. For example, the magnification input may be continuous input in which a user performs an initialization input and the magnification input is continuously or substantially continuously recognized by a gesture recognition device. In at least one example, the initialization input may be a simultaneous downward tap of a user's finger on each hand (as though to depress a button). In at least another example, the initialization input may be a simultaneous pinching motion of a user's finger and thumb together on each hand (as though to grab the virtual environment in the first position). The initialization input may be recognized by a gesture recognition device and may set a distance between the user's hands null point or origin for the magnification input. The magnification input may be a movement of the user's hand relative to the null point.

For example, moving hands apart may simulate "stretching" the virtual environment to increase the magnification of the virtual environment. In other examples, moving hands together may simulated "compressing" the virtual environment to decrease the magnification of the virtual environment and zoom out. The user may then cease the initialization input to terminate the continuous measurement of the magnification input and stop zooming. For example, the user may lift their fingers (as though releasing the buttons) or relax their fingers and thumbs (as though releasing a grasp on the virtual environment).

In some embodiments, the magnification input may be received from a touch-sensing device. For example, the touch sensing device may be a single touch device, such as a conventional trackpad. For a single touch device, the magnification input may be continuous input in which a user performs an initialization input and the magnification input is continuously or substantially continuously recognized by the trackpad. In at least one example, the initialization input may be a downward tap of a user's finger on the trackpad. The initialization input may be recognized by the trackpad and may set a null point or origin for the magnification input. The magnification input may be a movement of the user's hand relative to the null point on the trackpad. The user may then cease the initialization input to terminate the continuous measurement of the magnification input and stop zooming. For example, the user may lift their finger from the trackpad.

In other examples, the touch-sensing device may be a multi-touch device. For a multi-touch device, the magnification input may be continuous input in which a user performs an initialization input and the magnification input is continuously or substantially continuously recognized by the multi-touch device. In at least one example, the initialization input may be a downward tap of two of the user's fingers on the multi-touch device. The initialization input may be recognized by the multi-touch device and a distance between the two inputs may set a null point or origin for the magnification input. The magnification input may be a movement of the user's fingers relative to the null point on the multi-touch device. In some examples, increasing the distance between the two inputs (moving the fingers apart) may increase magnification (simulating "stretching" the virtual environment). In other examples, decreasing the distance between the two inputs (moving the fingers closer) may decrease magnification (simulating compressing the virtual environment). The user may then cease the initialization input to terminate the continuous measurement of the magnification input and stop zooming. For example, the user may lift their fingers from the multi-touch device.

In some embodiments, the magnification input may be provided by a motion controller, such as a 6DOF peripheral controller or an infrared camera tracked motion controller. For example, the magnification input may be continuous input in which a user performs an initialization input and the magnification input is continuously or substantially continuously recognized by the motion controller. In at least one example, the initialization input may be a press of a button on the motion controller that is held down while inputting the magnification input. In at least another example, the initialization input may be a press of a button the motion controller to toggle the state of the motion controller to a "magnification state". The initialization input may be recognized by a gesture recognition device and may set a null point or origin for the magnification input while the button is depressed or while the motion controller is toggled in a magnification state. The magnification input may be a movement of the motion controller relative to the null point.

For example, a user may move the motion controller (e.g., away from the user and/or toward the display) to "push" the virtual environment away from the user and zoom out. In other examples, a user may move the motion controller backward (e.g., toward the user and/or away from the display) to "pull" the virtual environment toward the user and zoom in. For some users, the opposite input may be more intuitive. For example, a user may move the motion controller forward (e.g., away from the user and/or toward the display) to "dive into" the virtual environment (or to indicate movement of the user's perspective toward the virtual environment) and zoom in. In other examples, a user may move the motion controller backward (e.g., toward the user and/or away from the display) to "back away from" the virtual environment and zoom out. The user may then cease the initialization input to terminate the continuous measurement of the magnification input and stop zooming. For example, the user may release the button or toggle the "magnification state" off.

In some embodiments, the magnification input may be voice input. For example, the magnification input may be received from a voice recognition device that recognizes or interprets speech from a user. The magnification input may be discrete inputs. For example, the voice recognition device may detect a percentage voice command of "increase magnification 100%" such as while viewing a virtual desktop or operating system. In other examples, the voice recognition device may detect a distance voice command of "zoom out one meter", to simulate the user moving one meter away from the virtual environment. In yet other examples, the voice recognition device may detect and open-ended voice command such as "begin zooming in" and a magnification of the virtual environment may increase until the voice recognition device detects a termination voice command such as "stop zooming".

In some embodiments, the magnification input may be received from a mouse. For example, the mouse may provide a toggle input for an initialization input, such as clicking the scroll wheel of the mouse. Clicking or holding the scroll wheel down may toggle the mouse into a "magnification state". The magnification input may be a movement of the scroll wheel while the mouse is in the magnification state. For example, scrolling the scroll wheel forward may "push" the virtual environment away from the user, decreasing the magnification and zooming out. In other examples, scrolling the scroll wheel backwards may "pull" the virtual environment toward the user, increasing the magnification and zooming in. For some users, the opposite input may be more intuitive. For example, a user may scroll the scroll wheel forward (e.g., away from the user and/or toward the display) to "dive into" the virtual environment (or to indicate movement of the user's perspective toward the virtual environment) and zoom in. In other examples, a user may scroll the scroll wheel backward (e.g., toward the user and/or away from the display) to "back away from" the virtual environment and zoom out. The user may then cease the initialization input to terminate the continuous measurement of the magnification input and stop zooming. For example, the user may release the scroll wheel and/or toggle the "magnification state" off.

In yet other embodiments, the input device may include foot pedals, brain scan interfaces, or other input devices from the user to the processor or other computing device in communication with the HMD.

The method may further include changing the magnification based on the magnification input centered on the first position of the user's gaze location. For example, the magnification inputs described here may cause the virtual environment to change magnification with the zooming (in or out) of the virtual environment being fixed relative to a first position of the user's gaze location of the user. In other words, the virtual environment may zoom in on the first position of the user's gaze location.

In some embodiments, the first position of the user's gaze location may move in the virtual environment while the magnification is changed. For example, at low magnification, the precise placement of the user's gaze location may be difficult. A dynamic first position of the user's gaze location during zooming may allow refinement to the zooming location during zooming. For example, a user may want to zoom in on a map to find a particular building in a city. The first position of the user's gaze location may, initially be on the city, while further zooming allows refinement to a region of the city, a block of the city, and finally the building of interest.

In other embodiments, the changes in magnification may be made based on the first position of the user's gaze location, which is fixed at the initialization and/or start of the changes to the magnification. Fixing the zoom location may allow the user to look at other areas of the virtual environment during zooming without altering the reference point of the zoom.

Figure 4:
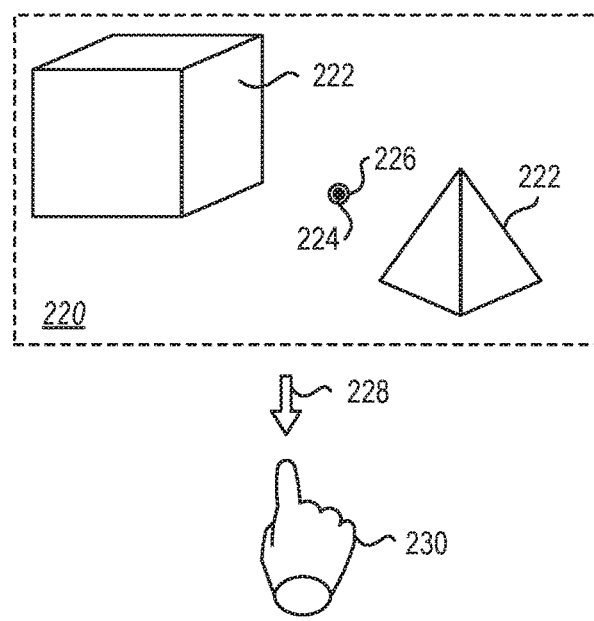
FIG. 4 is a schematic representation of a user's hand providing an initialization command in a virtual environment, according to at least one embodiment of the present disclosure.
Figure 5:
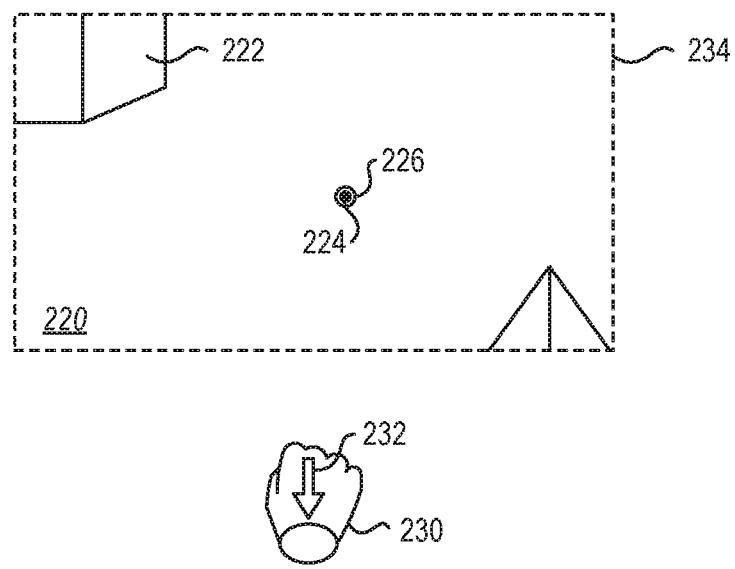
FIG. 5 is a schematic representation of a user's hand providing a magnification command in a virtual environment of FIG. 4, according to at least one embodiment of the present disclosure.
Figure 6:
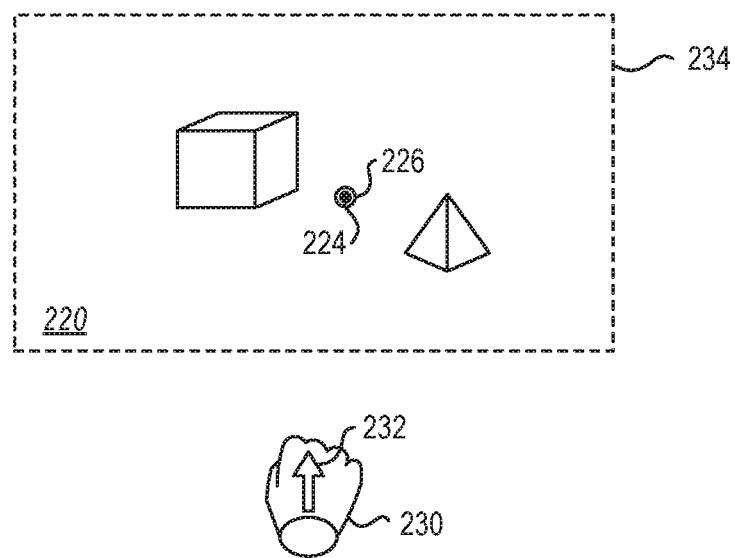
FIG. 6 is a schematic representation of a user's hand providing another magnification command in a virtual environment of FIG. 4, according to at least one embodiment of the present disclosure.

FIG. 4 through FIG. 6 illustrate an example of changing the magnification of a virtual environment using gesture inputs. FIG. 4 is a schematic representation of a virtual environment 220 containing a virtual element 222 that may be presented to a user on a display, such as the waveguide of the HMD 101 of FIG. 1, a display of a MR system, a display of a VR system, a display of an AR system, or other near-eye display in communication with a processor and/or a gaze-tracking device. While the present disclosure described interaction with the virtual environment 220 through a HMD, it should be understood that in other embodiments, the virtual environment 220 may be presented on another display, such as a laptop, tablet, desktop, large format, or other display in communication with a processor and/or a gaze-tracking device. For example, the methods and systems described herein may be equally applicable to a user interacting with a large format display on a wall of a conference room. The user may move and/or manipulate the virtual environment 220 using a gaze-tracking device and other input devices in communication with the large format display. In other examples a laptop may have a front facing camera that may function as a gaze-tracking device to allow gaze-based movement and/or manipulation of the virtual environment 220 by a user interacting with the laptop.

The user may interact with the virtual environment 220 by positioning their gaze at the virtual element 222 or other portion of the virtual environment 220. The gaze-tracking system in data communication with the processor of the HMD may measure a gaze location 224 at a first location 226 in the virtual environment 220.

A magnification of the virtual environment 220 may be changed while the gaze location 224 is positioned on the virtual element 222 by providing an initialization command 228 with an input device 230. In the depicted embodiment, the initialization command 228 may be a downward "click" of a user's finger and the input device 230 may be gesture recognition device that recognizes the click of the user's finger or other hand gesture. In FIG. 5, the gesture recognition device is schematically represented outside of the virtual environment 220 by the user's hand and gesture itself. In some embodiments, the gesture recognition device may be the camera described in relation to FIG. 1. In other embodiments, the gesture recognition device may be camera not connected to the housing of the HMD. In yet other embodiments, the gesture recognition device may be a glove or other wearable electronic device that senses the movement and position of the hand and parts of the hand.

FIG. 5 shows the input device 228 continuing to hold the initialization input by keeping the finger of the hand in the downward position. In other examples, the initialization input may toggle the magnification state of the input device 230, and the initialization input may be input once with the input device remaining in the magnification state until a subsequent termination input is received.

FIG. 5 illustrates an example of providing a magnification input with the input device 230 of FIG. 4. The user may provide a magnification input 232 using the input device 230. In particular, FIG. 5 illustrates a magnification input 232 to increase the magnification of the virtual environment 220. In some embodiments, the user's perception of the virtual environment 220 may be limited by a field of view 234. In some embodiments, increasing the magnification may limit the user's view of one or more virtual elements 222 of the virtual environment 220. FIG. 5 illustrates an example of a dynamic first position 226 of the gaze location 224 that follows the gaze location 224 during changes in the magnification of the virtual environment 220.

FIG. 6 illustrates an example of providing a magnification input 232 with the input device 230 to decrease the magnification of the virtual environment 220 of FIG. 4. For example, the magnification may decrease while the first position 226 remains fixed to the gaze location 224 relative to the field of view 234.

Figure 7:
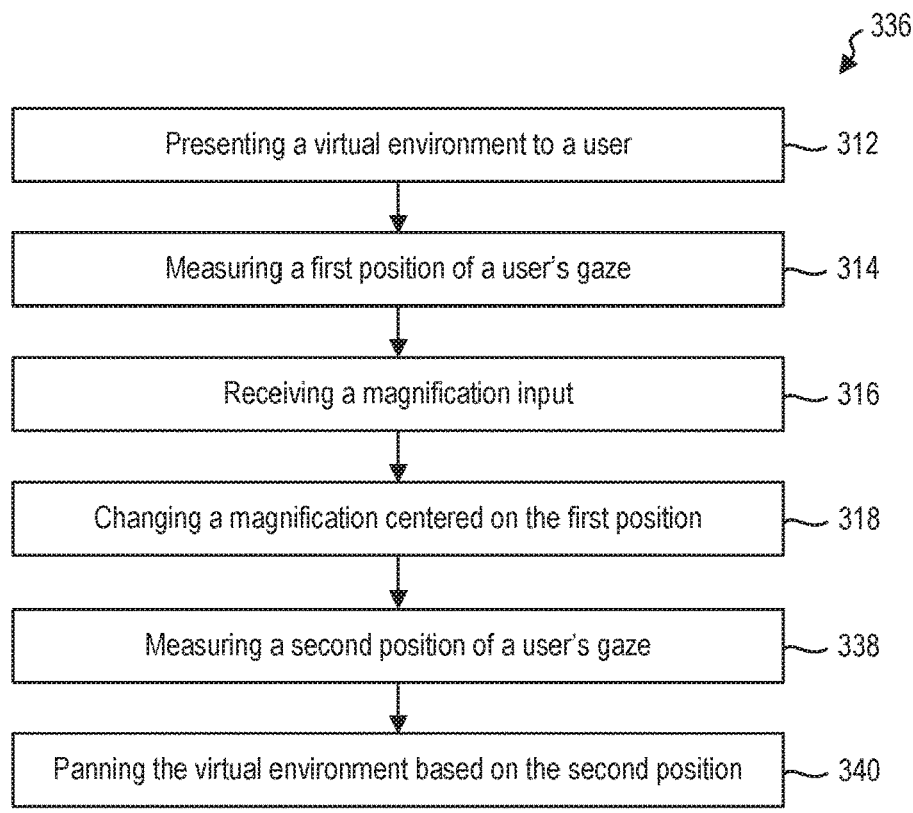
FIG. 7 is a flowchart illustrating a method of gaze-informed zoom and pan within a virtual environment, according to at least one embodiment of the present disclosure.

In some embodiments, a method for changing a user's perspective of a virtual environment may include changing the magnification and panning the user's viewpoint relative to the environment. FIG. 7 is a flowchart illustrating a method 336 of changing the magnification and panning the user's viewpoint. The method 336 may include presenting a virtual environment to a user at 312, measuring a first position of a user's gaze location at 314, receiving a magnification input at 316, and changing a magnification of the virtual environment centered on the first position at 318 similar to the method 110 described in relation to FIG. 3. The method 336 may further include measuring a second position of a user's gaze location 338 that is different from the first position at 338 and panning the virtual environment based on the second location at 340.

In some embodiments, measuring the second position of the user's gaze location may be similar to measuring the first position. For example, the second position may be measured by a gaze-tracking device that measures a position of the user's eyes. In other examples, the second position may be measured by a gaze-tracking device that measures a position of the user's head.

In some embodiments, the second position may be measured after a magnification input is received. For example, the magnification input may change the magnification of the virtual environment centered on a fixed first position. The first position may remain fixed for the purposes of changing the magnification, while allowing the gaze location to move freely and independently of the first position.

In some embodiments, panning the virtual environment based on the second position may be based on the position of the second position relative to the first position. For example, the vector of the panning may be related to the vector between the first position and the second position. In other embodiments, panning the virtual environment based on the second position may be based on the position of the second position relative to a panning frame overlaid on the user's perspective of the virtual environment. For example, the vector of the panning may be related to the location of the second position within the panning frame. In yet other embodiments, panning the virtual environment based on the second position may be based on the position of the second position relative to field of view of the virtual environment. For example, the vector of the panning may be related to the location of the second position at an edge of the user's field of view.

Figure 8:
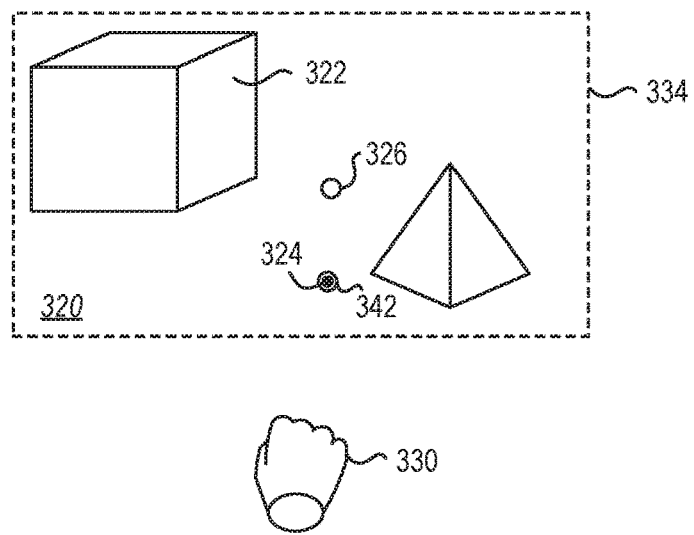
FIG. 8 is a schematic representation of a gaze location in a second position a virtual environment, according to at least one embodiment of the present disclosure.

FIG. 8 illustrates an example of a virtual environment 320 containing at least one virtual element 322. A first position 326 of the user's gaze is near a center of the field of view 334 of the virtual environment 320. The gaze location 324 has moved from the first location 326 while the first location remains fixed. The second location 342 is measured by the gaze-tracking device. The input device 330 may remain in an initialized and/or magnification state. In some embodiments, magnification of the virtual environment 320 may be possible during panning, if the user chooses. In other embodiments, the magnification may lock during panning.

Figure 9:
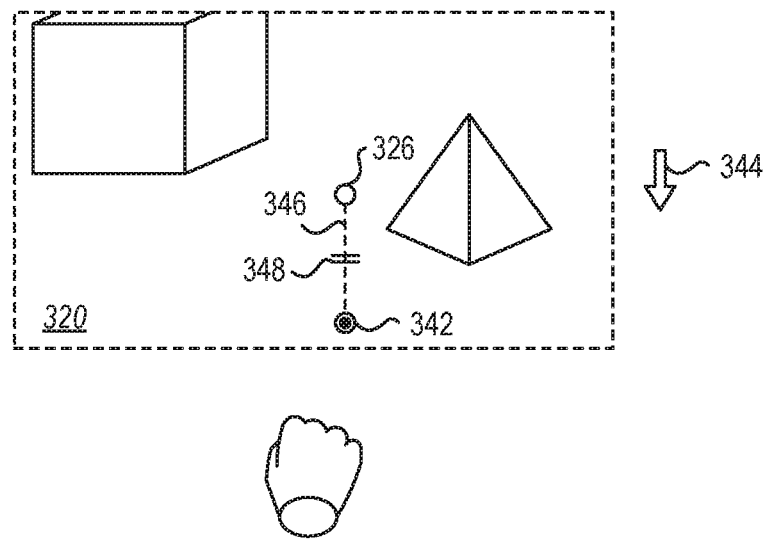
FIG. 9 is a schematic representation of a gaze vector in a virtual environment, according to at least one embodiment of the present disclosure.

FIG. 9 illustrates the virtual environment 320 of FIG. 8. The user's perspective may pan relative to the virtual environment 320 based on a panning vector 344 that is related to a gaze vector 346. In some embodiments, the panning vector 344 may determine the direction and speed of panning. The panning vector 344 may be related to the direction and magnitude of the gaze vector 346 generated between the first position 326 and the second position 342. In other words, as the gaze vector increase in magnitude, the panning vector 344 may increase in magnitude with a related increase in panning speed.

In some embodiments, the gaze vector 346 may not be calculated until a distance threshold 348 is exceeded by the gaze location 324 from the first position 326. A distance threshold 348 may limit accidental panning of the user's perspective, or, in the case of a system locking the magnification during panning, prevent or limit inadvertent locking of the magnification.

In some embodiments, the distance threshold 348 may be an angular displacement relative to the user's viewpoint. For example, a rotation of the gaze location 324 relative to the user of more than 2° from the first position 326 may prompt calculation of the gaze vector 346, and hence being panning the user's perspective of the virtual environment 320. In other examples, a rotation of the gaze location 324 relative to the user of more than 4° from the first position 326 may prompt calculation of the gaze vector 346. In yet other examples, a rotation of the gaze location 324 relative to the user of more than 6° from the first position 326 may prompt calculation of the gaze vector 346.

Figure 10:
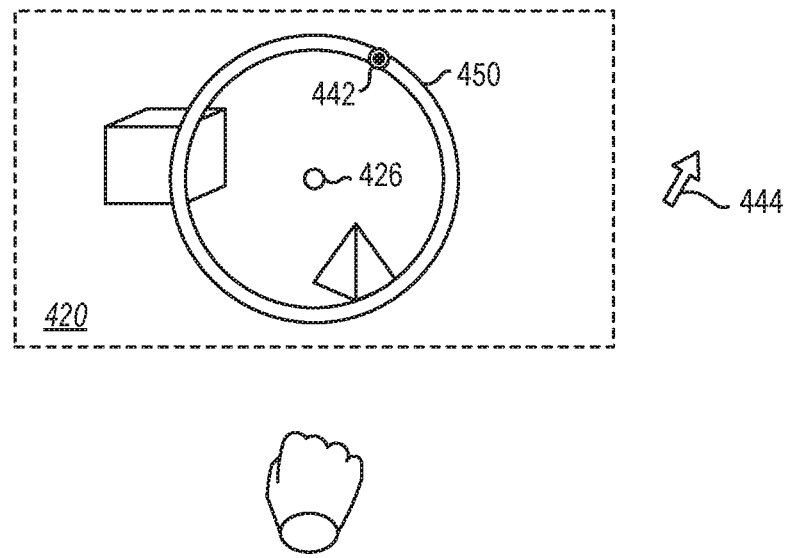
FIG. 10 is a schematic representation of a panning frame in a virtual environment, according to at least one embodiment of the present disclosure.

FIG. 10 illustrates an embodiment of panning the user's perspective of a virtual environment 420 based on a second location 442 relative to a panning frame 450 centered on the first position 426. Measuring the second position 442 on the panning frame 450 may generate a panning vector 444 of a set magnitude in the direction of the portion of the panning frame 450 that the second position 442 contacts. In other words, the panning vector 444 may have a direction determined by the second position 442 while the magnitude of the vector is a constant.

Figure 11:
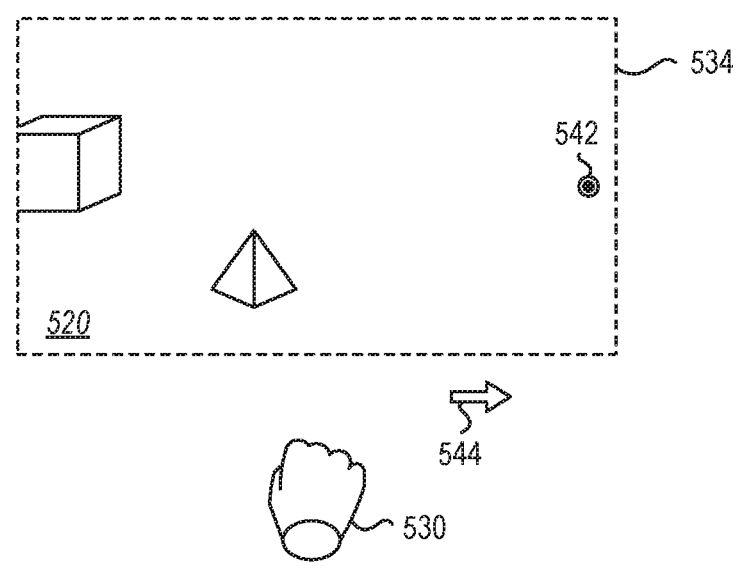
FIG. 11 is a schematic representation of field of view panning in a virtual environment, according to at least one embodiment of the present disclosure.

FIG. 11 illustrates an embodiment of panning the user's perspective of a virtual environment 520 based on a second location 542 relative to a field of view 534 of the virtual environment 520. For example, when a user views the virtual environment in a HMD, the field of view 534 of the virtual environment 520 may be related to the user's head position, while the gaze-tracking device may track the direction of a user's eyes relative to the presented field of view 534. When the user's gaze is measured at a second position 542 contacting the edge of the field of view 534, a panning vector 544 of fixed magnitude may be calculated. In other embodiments, the magnitude of the panning vector 544 may be related to the proximity of the second location relative to the edge of the field of view 534. In other examples, when a user views the virtual environment 520 on a display other than a HMD (such as laptop or a large format display), the field of view of virtual environment 520 may be independent of the user's head position, allowing the gaze-tracking device to calculate the second position using either the head position or the eye position.

Panning and zooming may be terminated by releasing the initialization input or toggling the input device 530 out of the magnification state.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for improving user interaction with a three-dimensional virtual environment, the method comprising:
presenting the three-dimensional virtual environment to a user with a head-mounted display (HMD), the virtual environment including a plurality of virtual objects;
measuring a first position of a user's gaze relative to the virtual environment;
receiving an initialization input to enter a magnification state, wherein the initialization input is a gesture of a user's hand including a movement of a pointed finger toward a palm of the hand, and wherein the magnification state allows measurement of a magnification input;
receiving the magnification input while in the magnification state, the magnification input being different from the initialization input and being a gesture of the user's hand include movement of the user's hand relative to the HMD;
changing a magnification of a user's perspective of the virtual environment including the plurality of virtual objects centered on the first position and based on the magnification input; and
exiting the magnification state.

2. The method of claim 1, measuring the first position of the user's gaze including measuring a position of a user's eye.

3. The method of claim 1, the magnification input being received from a gesture recognition device, and the initialization input being received from the same gesture recognition device.

4. The method of claim 1, the magnification input being received from a gesture recognition device including a depth camera.

5. The method of claim 1, the initialization input being received from a gesture recognition device including a depth camera.

6. The method of claim 1, receiving the magnification input being continuous while changing the magnification of the virtual environment.

7. The method of claim 1, measuring the first position of the user's gaze including measuring a position of a user's head.

8. The method of claim 1, the initialization input being a discrete input that toggles the magnification state and wherein exiting the magnification state includes receiving a termination input to toggle out of the magnification state.

9. A method for improving user interaction with a three-dimensional virtual environment, the method comprising:
presenting the three-dimensional virtual environment to a user with a head-mounted display (HMD), the virtual environment including a plurality of virtual objects;
measuring a first position of a user's gaze relative to the virtual environment;
receiving an initialization input to enter a magnification state, wherein the initialization input is a gesture of a user's hand including a movement of a pointed finger toward a palm of the hand, and wherein the magnification state allows measurement of a magnification input;
receiving the magnification input while in the magnification state, the magnification input being different from the initialization input and being a gesture of the user's hand include movement of the user's hand relative to the HMD;
changing a magnification of a user's perspective of the virtual environment centered on the first position and based on the magnification input;
measuring a second position of the user's gaze relative to at least one element of the virtual environment; and
panning the user's perspective of the virtual environment relative to a user position based on the second position; and
exiting the magnification state upon ceasing to receive the initialization input.

10. The method of claim 9, the at least one element of the virtual environment being the first position.

11. The method of claim 9, panning the virtual environment at a speed based on a distance from the second position to the at least one element of the virtual environment.

12. The method of claim 9, the at least one element being a guidance frame in the virtual environment.

13. The method of claim 9, the at least one element being a perimeter of a field of view of the virtual environment.

14. The method of claim 9, further comprising fixing the magnification of the virtual environment during panning.

15. A system for presenting visual information to a user, the system comprising:
a head-mounted display, the head-mounted display including:
a near-eye display,
a gaze-tracking device,
a processor in communication with the near-eye display and gaze-tracking device, and
a hardware storage medium in communication with the processor, the hardware storage medium having instructions thereon that, when executed by the processor, cause the processor to:
measure a first position of a user's gaze relative with the gaze-tracking device to a three-dimensional virtual environment presented on the near-eye display,
receive an initialization input to enter a magnification state, wherein the initialization input is a gesture of a user's hand including a movement of a pointed finger toward a palm of the hand, and wherein the magnification state allows measurement of a magnification input,
receive the magnification input while in the magnification state, the magnification input being different from the initialization input and being a gesture of the user's hand include movement of the user's hand relative to the HMD, and
change a magnification of a user's perspective of the virtual environment centered on the first position and based on the magnification input.

16. The system of claim 15, the instructions further comprising causing the processor to:
measure a second position of the user's gaze relative to at least one element of the virtual environment; and
pan the virtual environment relative to a user position based on the second position.

17. The system of claim 15, further comprising a waveguide in communication with the display device, where the virtual environment is presented on the waveguide.

18. The system of claim 15, the gaze-tracking device including a plurality of cameras to track a user's eyes.

19. The system of claim 15, further comprising a gesture recognition device configured to provide the magnification input.

20. The system of claim 15, further comprising a touch-sensing device configured to provide the magnification input.

* * * * *